Oct. 9, 1951 — R. LEATHORN — 2,570,569
ILLUMINATED MIRROR ASSEMBLY
Filed Dec. 2, 1947
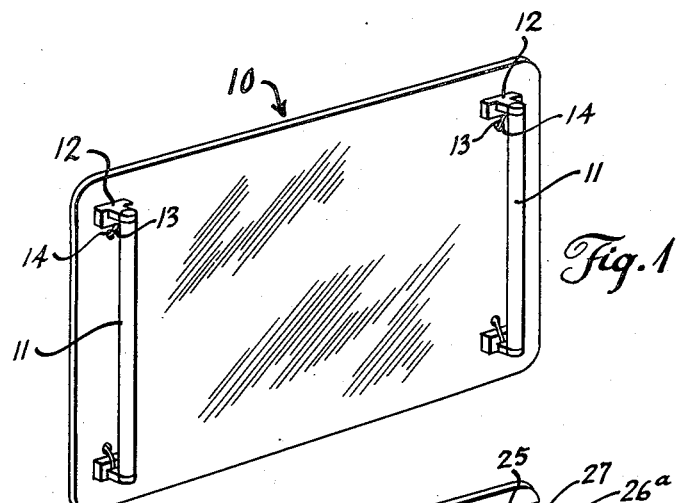
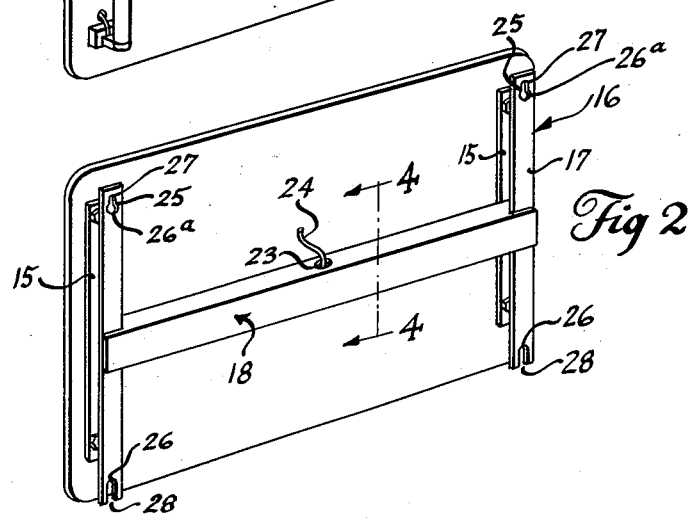
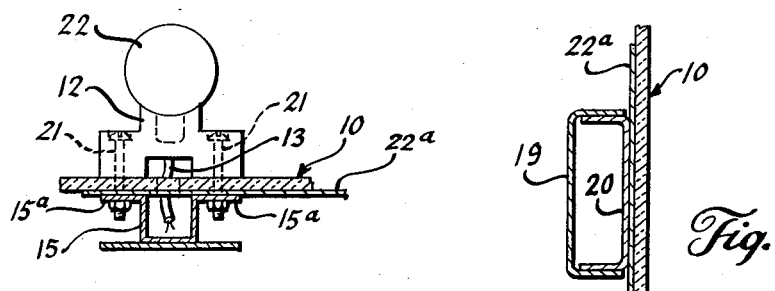
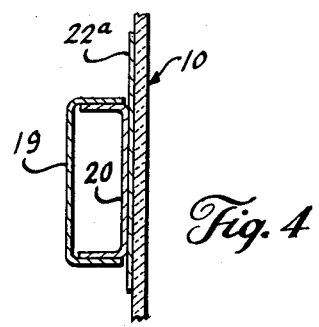
INVENTOR
R. LEATHORN
By: Fetherstonhaugh & Co.
ATT'YS

UNITED STATES PATENT OFFICE 2,570,569

ILLUMINATED MIRROR ASSEMBLY

Robert Leathorn, Chatham, Ontario, Canada

Application December 2, 1947, Serial No. 789,271

1 Claim. (Cl. 240—4.2)

This invention relates to an illuminated mirror and supporting means therefor.

In installations where illumination is required near a mirror such as fluorescent lighting units placed on either side of the mirror, many difficulties are encountered both in mounting the mirror and mounting the lighting units so that the mirror and the lighting units are fastened securely to the wall and the wires for the lighting unit are properly concealed.

It is therefore, the prime object of my invention to provide an illuminated mirror wherein a novel support frame serves not only to mount the mirror, but also to mount the lighting units, as well as serving to conceal the wiring beneath the lighting units. Outstanding advantages accrue in that the frame supporting the mirror and the lighting units as a combination, is mountable on a wall by simply suspending the assembly on pegs placed in the wall. It will be apparent therefore, that the structure of the present invention avoids disadvantages previously experienced.

With the above, and other objects in view, my invention generally comprises a frame, preferably formed of sheet metal stampings and designed to support a mirror and to house wiring for lighting units which are mounted on the outer or brilliant face of the mirror in conjunction with the fastening of the mirror to the frame.

In order to mount the frame, mirror, and lighting unit assembly on a wall, it is merely necessary to place pegs in the wall, and to hang the frame onto the pegs by means of suitable slots or orifices in the frame whereby the illuminated mirror is mounted on the wall in a simple and effective manner.

Other objects of the invention will be revealed by a study of the following specification taken in conjunction with the accompanying drawings.

In the drawings,

Figure 1 is a front face perspective view of an illuminated mirror according to my invention.

Figure 2 is a perspective view of the rear of the mirror of Figure 1 showing the frame which supports the mirror and illuminating means.

Figure 3 is a partial sectional view of one mounting for a lighting unit showing same fastened through the mirror and to the frame behind the mirror.

Figure 4 is view 4—4 of Figure 2.

Now referring more particularly to the drawings, the mirror 10 in Figure 1 is shown having fluorescent lighting tubes 11 mounted on either side by mounting brackets 12. Wires 13 from the mounting brackets extend through the mirror by means of suitable holes 14 and into concealment within the U-shaped support member 15 as indicated in Figure 3.

In Figures 2 and 3, the frame structure 16 comprises the upright support members 15 which carry an upright strip 17 fastened thereto by spot welding or other suitable means, depending upon the material used. A crossbar 18 formed of two channel pieces 19 and 20 as shown in Figure 4 is fastened to the strip 16 and the support members by spot welding or other suitable means. Members 15 have suitable holes in flanges 15a positioned to accommodate screws 21 which pass through the mirror 10 and serve to mount the mounting brackets 12 and the glass to the support members. Mounting brackets 12 are of conventional construction and are adapted to receive a conventional, removable socket 22, which is designed to receive the terminal ends of the lighting tubes 11. I prefer to include a fibre sheet packing 22a between the mirror 10 and support members 15 and crossbar 18 as shown in Figures 3 and 4, to prevent metal-to-glass contact and possible cracking of the mirror when the screws 21 are tightened.

The components I have described, when assembled, form a unit wherein the frame 16 serves to support the glass 10 and the brackets 12 and lighting tubes 11. The wires 13 which extend from the lighting units into the interior of the support members 15 as shown in Figure 3 are brought to the outlet 23 and extend therefrom as shown by wire 24 to a suitable electrical socket (not shown).

In order to mount the present illuminated mirror assembly on a wall, it is merely necessary to place pegs into the wall in positions corresponding to the measured distinctions between the orifices 25 and slots 26 in the support members 15. It will be apparent that the orifices 25 have an enlarged portion 26a and a small slot portion 27 extending upwardly therefrom so that the orifice may be placed over the head of a nail or the like, and then the weight of the mirror assembly will cause it to be suspended in the slot 27. Slots 26 at the lower ends of the support members are designed to engage nails or studs extending from the wall surface (not shown) the slots having opening lower ends 28, so that slight errors in location of the pins, studs or nails, into the wall, will not interfere with hanging the mirror effectively.

It will be apparent that my invention as described will accomplish the objects set out. The device is an article which saves great time in installation costs of illuminated mirror units and insures a dependable installation.

It is intended that the present disclosure should not be construed in a limiting sense other than that indicated by the scope of the following claim.

What I claim as my invention is:

An illuminated mirror assembly adapted to be hung on pegs in a wall, comprising a mirror pane, a pair of support members mountable on the back of said mirror, a crossbar extending between said support members to impart rigidity thereto, bracket members mountable on the exterior face of said mirror, fastening means for connecting said bracket members, said mirror and said support members together lighting tubes mounted in said bracket members and disposed for reflection of their light by said mirror a connecting wire extending from each of said brackets, said mirror having holes designed for passage of said wires, said support members being designed to house said wires for passage along the back of said mirror, said cross member being designed to house said wires extending from said support member, said crossbar having a hole for exit of a common wire electrically connected to said wires and said brackets whereby said wires for said illuminating means are concealed behind said mirror.

ROBERT LEATHORN.

REFERENCES CITED

The following references are of record in the file of this patent:

UNITED STATES PATENTS

| Number | Name | Date |
|---|---|---|
| D. 91,820 | Guild | Mar. 27, 1934 |
| D. 125,120 | Shulman | Feb. 11, 1941 |
| D. 135,201 | Grady | Mar. 9, 1943 |
| 1,615,936 | Donovan | Feb. 1, 1927 |
| 1,786,420 | Braly | Dec. 30, 1930 |
| 1,820,348 | Corwin et al. | Aug. 25, 1931 |
| 2,014,690 | Minton | Sept. 17, 1935 |
| 2,048,939 | Leathorn | July 28, 1936 |
| 1,952,315 | Henkel et al. | Mar. 27, 1934 |